United States Patent
Schmed

(10) Patent No.: US 6,321,638 B1
(45) Date of Patent: Nov. 27, 2001

(54) COFFEE MACHINE ASSEMBLY

(75) Inventor: Arthur Schmed, Oberduernten (CH)

(73) Assignee: Fianara International B.V., Amsterdam (NL)

( * ) Notice: Subject to any disclaimer, the term of this patent is extended or adjusted under 35 U.S.C. 154(b) by 0 days.

(21) Appl. No.: 09/562,605

(22) Filed: May 1, 2000

(30) Foreign Application Priority Data

May 12, 1999 (CH) .................................................. 0910/99

(51) Int. Cl.[7] ....................................................... A47J 31/00
(52) U.S. Cl. .................................. 99/279; 99/281; 99/285; 99/290
(58) Field of Search .............................. 99/279, 281, 285, 99/300, 304, 305, 306, 307, 290; 312/409, 403, 229, 236, 237, 242, 243, 223.1

(56) References Cited

U.S. PATENT DOCUMENTS 4,872,402 * 10/1989 Johnson et al. ..................... 99/295 X
5,370,040 * 12/1994 Andrew et al. ......................... 99/295

FOREIGN PATENT DOCUMENTS

3295515 * 12/1991 (JP) ....................................... 99/279

OTHER PUBLICATIONS

The Miele CVA 610; 1998; webmaster@mieleusa.com, 1998.*

* cited by examiner

Primary Examiner—Reginald L. Alexander
(74) Attorney, Agent, or Firm—Tarolli, Sundheim, Covell, Tummino & Szabo L.L.P.

(57) ABSTRACT

A coffee machine assembly is designed to be received in a kitchen furnishing. For this purpose, the front area of the coffee machine assembly is built as an integral part of a front plate member of the kitchen furnishing. The front area of the coffee machine assembly extends but over a portion of a front plate member of the kitchen furnishing. Thus, additional space is available for a receiving area for receiving items as, for example, coffee cups. Preferably, the receiving area is located besides the coffee machine and provided with subdivisions in vertical direction. The coffee machine itself is designed as a compact unit and is placed, for example, on an extendable unit. Moreover, at least a portion of the receiving area could be heated.

16 Claims, 3 Drawing Sheets

COFFEE MACHINE ASSEMBLY

BACKGROUND OF THE INVENTION

The present invention refers to a coffee machine assembly, adapted to be integrated in a kitchen furnishing, comprising a coffee machine unit, having a front area with operating and coffee dispensing means.

PRIOR ART

Coffee machines to be used in the household, nowadays, are mostly built as table models. A disadvantage in connection with these machines can be seen in the fact that they permanently occupy a considerable amount of space.

There have been some attempts in the prior art to solve this problem. Particularly, coffee machines are known that are designed as built-in units but that are designed to fit the standard opening of a kitchen cabinet. Thereby, the front area of these coffee machines extends over the entire front of the kitchen furnishing with the result that the entire opening of a kitchen cabinet is occupied by the coffee machine. A further disadvantage of such coffee machines may be seen in the fact that they have to be designed in a special way to enable them to be built in into a kitchen cabinet. Thus the manufacturing costs of such machines are much higher.

OBJECTS OF THE INVENTION

It is therefore an object of the present invention to provide a coffee machine assembly that can be adapted to the conditions to be received in a kitchen furnishing with low additional expenditure. It is a further object of the present invention to provide a coffee machine assembly such that the available space in a kitchen furnishing can be exploited in the best way.

SUMMARY OF THE INVENTION

To meet these and other objects, the present invention provides a coffee machine assembly, adapted to be integrated in a kitchen furnishing, comprising a coffee machine unit, having a front area with operating and coffee dispensing means, and at least one receiving area located adjacent to the front area.

The front area is designed as an integral part of the front surface of the kitchen furnishing, and it extends only over a portion of the front surface of the kitchen furnishing.

In a preferred embodiment of the coffee machine assembly, the receiving area is adapted to receive at least one further beverage preparing unit. As an example, a soda water preparing unit could be considered, particularly if the coffee machine unit is directly connected to a fresh water supply. In that case, the fresh water supply can be used both for the coffee machine unit and the soda water unit.

In another embodiment of the invention, the receiving area can be designed, at least partially, for receiving beverage containers such as coffee cups or the like, and means could be provided to heat and/or cool that receiving area.

A heating of the receiving are is particularly advantageous if the receiving area is designed to receive espresso cups since such espresso cups have a high proportion of ceramics material, as compared to the amount of the beverage to be received; thereby, the espresso beverage is cooled down in a disadvantageous manner.

A cooling of the receiving area is particularly advantageous if the receiving area is designed to receive beverages that usually have to be cooled down before serving.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
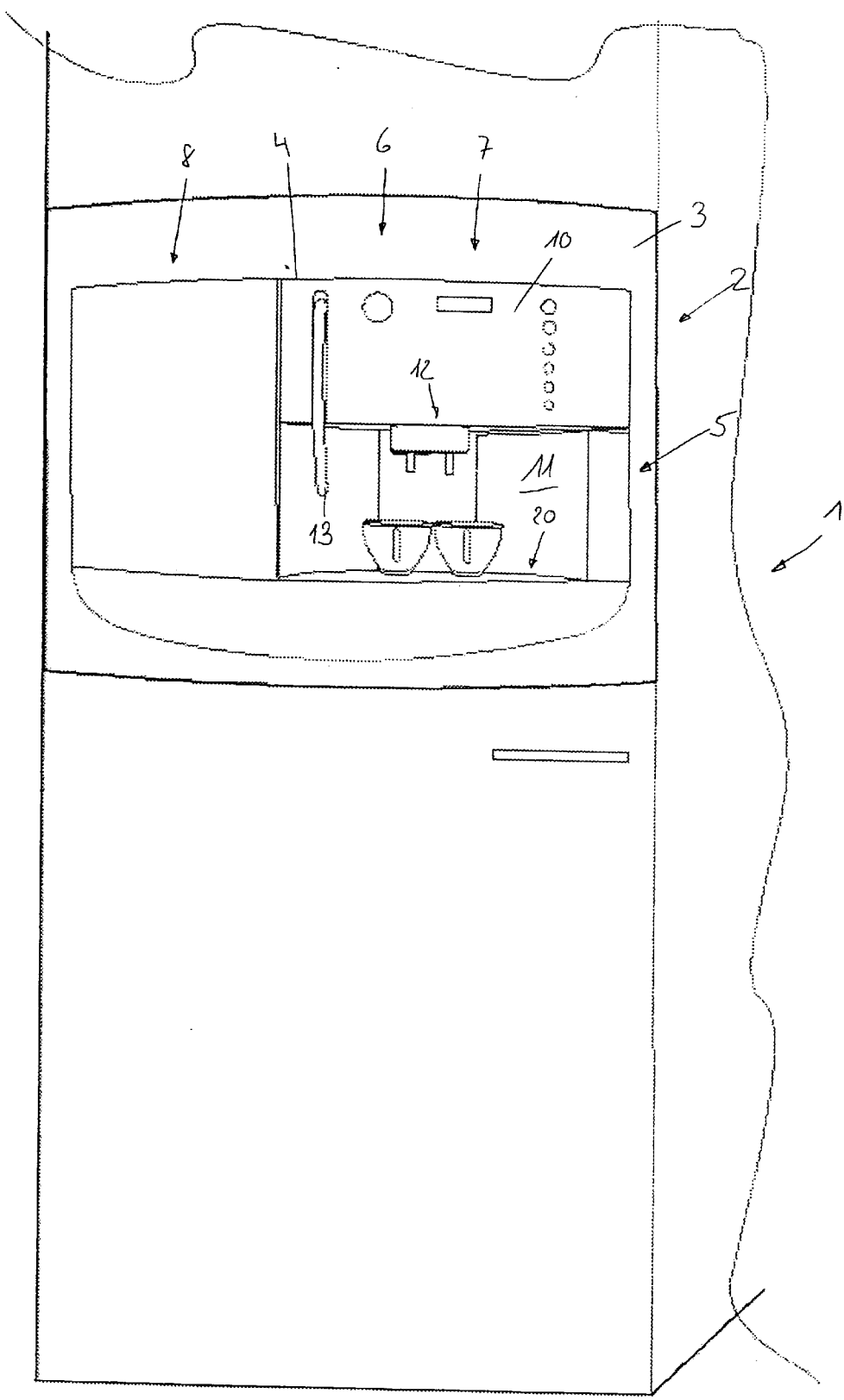
FIG. 1 shows a front view of a coffee machine assembly received in a kitchen cabinet.

First, with the help of the drawing shown in FIG. 1, the general design of the coffee machine assembly according to the invention shall be further described.

FIG. 1 shows a partial view of a kitchen furnishing 2. Thereby, only a cabinet 1 is shown, constituting a portion of the furnishing 2, and having a front portion in the shape of a front plate member 3. The front plate member 3 is provided with a recess 4. The coffee machine assembly 6 is received in the kitchen furnishing 2 and, thereby, in the cabinet 1, such that the front area 10 of the coffee machine assembly is flush with the aforementioned front plate member 3. Thus, the coffee machine assembly 6 is an integral part of the kitchen furnishing 2.

The coffee machine assembly 6 comprises a coffee machine 7 as well as a receiving area 8. It is understood that the receiving area 8 is not shown in detail in FIG. 1; further details will be given herein after. The front area 10 of the coffee machine 7 comprises a plurality of actuating means that need not to be further described. Moreover, the front area 10 is provided with a recessed portion 11 in which is provided a coffee dispensing unit 12.

Thus, one basic idea in connection with this embodiment can be seen in the fact that the front area 10 of a household coffee machine 7, that is known per se, is designed such that it is an integral part of the front of the kitchen furnishing 2. Thereby, the front area 10 extends only along a portion of the cabinet such that the remaining portion can be used to be designed as a receiving area 8.

Figure 2:
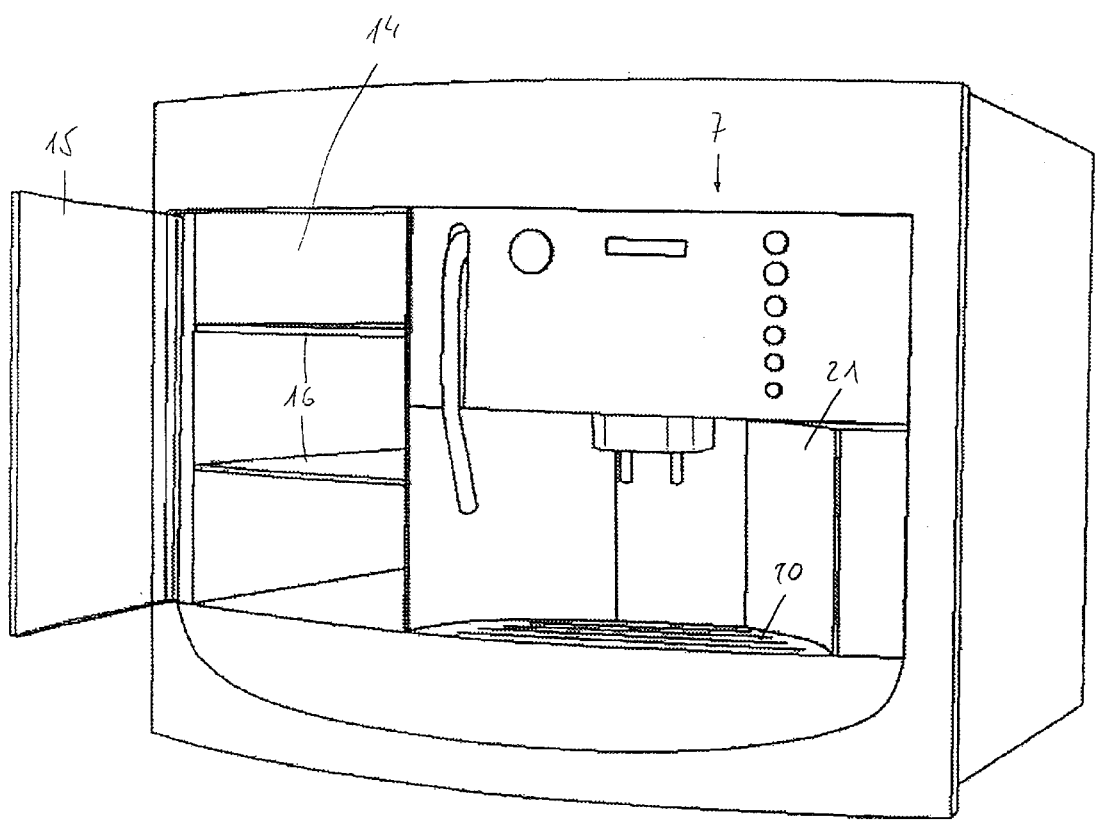
FIG. 2 shows a perspective view of the coffee machine assembly, as seen from the right side.

As can be seen in FIG. 2, the receiving area 8 comprises a cabinet portion 14 provided with a door 15. The door 15 being closed, it forms an integral portion of the front of the kitchen furnishing 2 as well. The receiving area 8 is subdivided in vertical direction by means of shelves 16, serving to receive a variety of utensils. In the present embodiment, as shown in the drawings, it can serve for receiving coffee and/or espresso cups. According to a preferred embodiment, —not shown here in detail—, the receiving area 8 is provided with an electrical resistance heating means adapted to heat the interior of the cabinet portion 14. This is particularly suitable in the case where the interior of the cabinet portion 14 is meant to receive coffee or espresso cups.

It is understood that the interior of the receiving area 8 can be designed to receive other objects; in other words, it must not be designed to receive only cups and maybe glasses. For example, another subdivision is possible to receive, besides coffee cups, also coffee beans, coffee spoons, sugar, tea etc.

It is understood that the receiving area 8 can be located above or below the coffee machine assembly 6, depending on the design and the size of the latter one.

From the illustration of FIG. 1, particularly the operating elements, the coffee dispensing unit 12 as well as a steam outlet 13 of the coffee machine 7 are visible. The recessed portion 11 is delimited, at the lower side, by a collecting dish member 20 adapted to collect residual water. That collecting dish member 20 can be removed from the front side. At the right side of the coffee machine 7, there is provided a collecting container member 21 adapted to receive the used coffee powder. Again, this collecting container member 21 can be removed from the front side of the assembly.

Besides the operating and dispensing means shown in the drawings and discussed herein above, and that don't need further explanations, the coffee machine 7 can be provided with additional or alternative operating and/or dispensing means. For example, a steamer for milk could be provided, for example for preparing cappuccino. In this case, it could be favorable to design the receiving area in such a way that a milk container can be received therein, containing the milk required to prepare the cappuccino.

The coffee machine itself preferably is designed as a compact unit that can be replaced, if necessary, quickly and simply as a group. Thereby, it can be fixed by means of only a couple of screws to the kitchen furnishing 2, or a snap-in mechanism (not shown) can be provided to fix it to the kitchen furnishing 2.

In the present example, the coffee machine is provided with a conventional fresh water tank. However, it is understood that, in stead of or additionally, a fluid coupling device could be provided to enable the coffee machine to be directly connected to a fresh water conduit. As an alternative to the shown coffee bean container, that can be filled only after the coffee machine assembly has been pulled out, an opening or a container accessible from the front side could be provided. Moreover, also refill opening could be provided to fill in fresh water from the front side of the coffee machine.

As already mentioned, the receiving area can be used for other purposes. For example, another beverage preparing unit like a soda water unit could be provided in that place.

Figure 3:
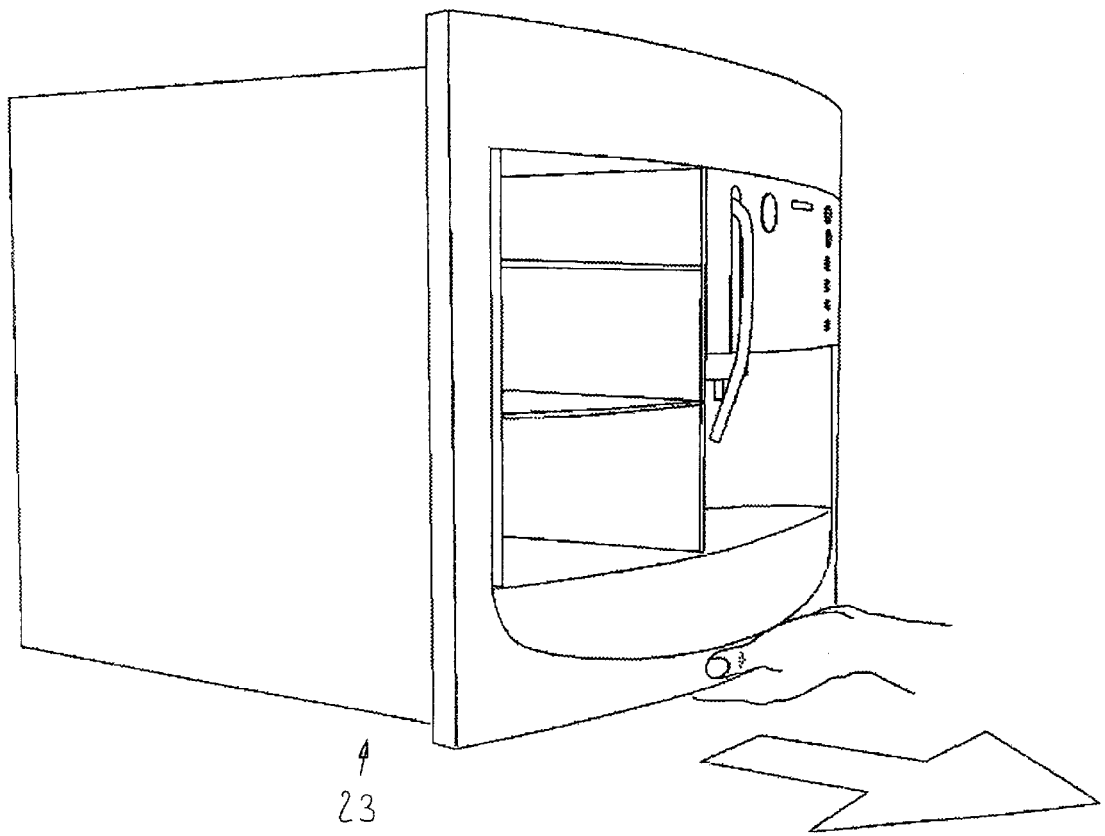
FIG. 3 shows a perspective view of the coffee machine assembly, as seen from the left side.

According to FIG. 3, it can be seen that the coffee machine assembly 6 also can be realized as a pull out unit or can be mounted on a pull out mechanism, such to be able to be pulled out in the direction of the arrow and pushed back in the opposite direction. Since the general design of such pull out mechanism is well known to any person skilled in the art, no further explanation is given here. However, it should be understood that such a pull out mechanism 23 could be provided with mechanical and/or hydraulic and/or electrical interfaces, to provide for a quick and easy mechanical fixing of the coffee machine assembly, and/or a quick and easy connection of the coffee machine assembly to an electrical power source and/or a quick and easy connection of the coffee machine assembly to a fresh water supply. Thereby, it is understood that those interfaces are not further shown in the drawings.

What is claimed is:

1. A coffee machine assembly, adapted to be integrated in a kitchen furnishing means, comprising:
   a coffee machine unit means, having a front area means with operating and coffee dispensing means and for receiving at least one beverage container;
   at least one receiving area means located adjacent to said front area means;
   said front area means being designed as an integral part of the front surface means of said kitchen furnishing means and extending only over a portion of said front surface means of said kitchen furnishing means;
   said receiving area means being located beside said front area means of said coffee machine unit means; and
   said receiving area means having at least one further beverage preparing means for preparing beverages other than coffee.

2. A coffee machine assembly according to claim 1 in which said receiving area means is adapted at least partially to receive beverage container means, particularly to receive coffee cup means and/or drinking glasses.

3. A coffee machine assembly according to claim 1 in which said coffee machine unit means is designed as an autonomous unit.

4. A coffee machine assembly according to claim 1 in which said coffee machine unit means is located on an extension means.

5. A coffee machine assembly according to claim 1 in which said receiving area means is provided with a door means, said door means, once being in its closed position, forming an integral part of the kitchen furnishing.

6. A coffee machine assembly according to claim 1 in which said front area means of said coffee machine means is provided with a collecting dish member adapted to collect residual water.

7. A coffee machine assembly according to claim 6 in which said front area means of said coffee machine means is provided with a collecting container member adapted to collect used coffee powder.

8. A coffee machine assembly according to claim 7 in which said collecting dish member adapted to collect residual water and said collecting container member adapted to collect used coffee powder are accessible from the front side of the coffee machine unit means.

9. A coffee machine assembly, adapted to be integrated in a kitchen furnishing means, comprising:
   a coffee machine unit means having a front area means with operating and coffee dispensing means;
   at least one receiving area means located adjacent said front area means;
   said front area means being designed as an integral part of the front surface means of said kitchen furnishing means and extending only over a portion of said front surface means of said kitchen furnishing means; and
   said receiving area means being located beside said front area means of said coffee machine unit means and being provided with subdivisions in a vertical direction.

10. A coffee machine assembly according to claim 9 in which said receiving area means is adapted at least partially to receive beverage container means, particularly to receive coffee cup means and/or drinking glasses.

11. A coffee machine assembly according to claim 9 in which said coffee machine unit means is designed as an autonomous unit.

12. A coffee machine assembly according to claim 9 in which said coffee machine unit means is located on an extension means.

13. A coffee machine assembly according to claim 9 in which said receiving area means is provided with a door means, said door means, once being in its closed position, forming an integral part of the kitchen furnishing.

14. A coffee machine assembly accordingly to claim 9 in which said front area means of said coffee machine means is provided with a collecting dish member adapted to collect residual water.

15. A coffee machine assembly according to claim 14 in which said front area means of said coffee machine means is provided with a collecting container member adapted to collect used coffee powder.

16. A coffee machine assembly according to claim 15 in which said collecting dish member adapted to collect residual water and said collecting container member adapted to collect used coffee powder are accessible from the front side of the coffee machine unit means.

* * * * *